J. E. DUKELOW.
SPRING FRAME FOR BICYCLES OR THE LIKE.
APPLICATION FILED MAR. 5, 1910.
1,136,870. Patented Apr. 20, 1915.
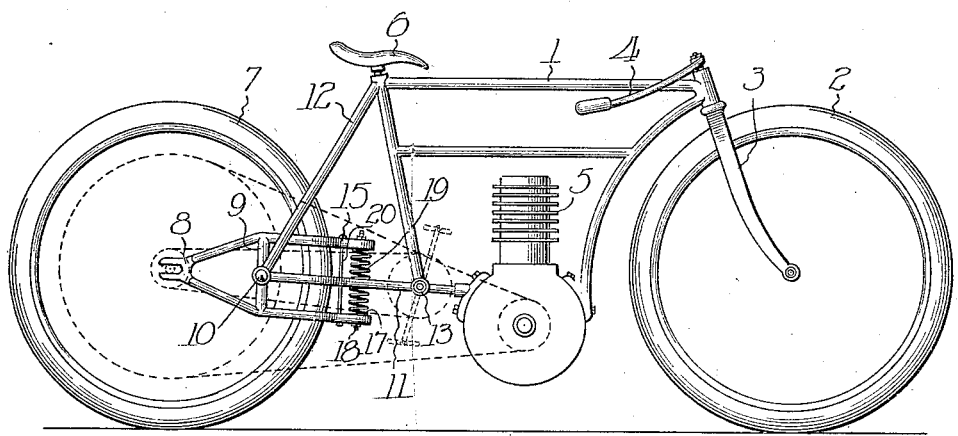
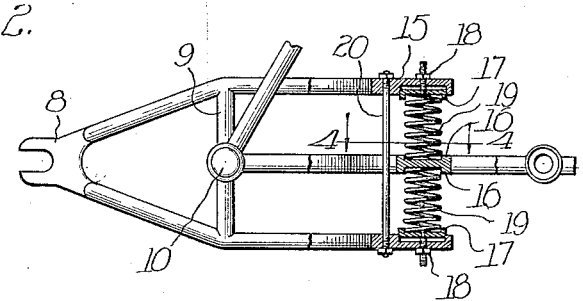
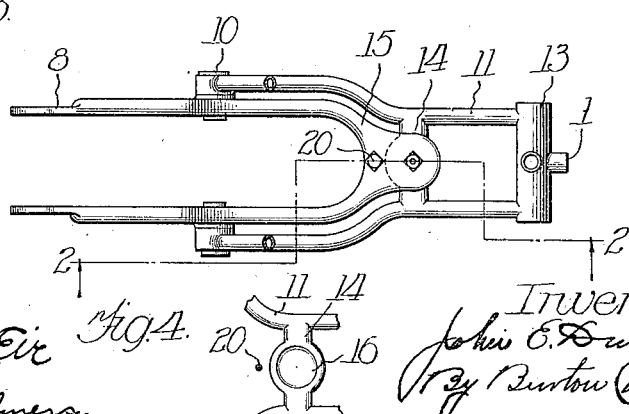

UNITED STATES PATENT OFFICE.

JOHN E. DUKELOW, OF CHICAGO, ILLINOIS.

SPRING-FRAME FOR BICYCLES OR THE LIKE.

1,136,870.  Specification of Letters Patent.  Patented Apr. 20, 1915.

Application filed March 5, 1910. Serial No. 547,616.

*To all whom it may concern:*

Be it known that I, JOHN E. DUKELOW, a citizen of the United States, residing at Chicago, in the county of Cook and State of Illinois, have invented certain new and useful Improvements in Spring-Frames for Bicycles or the like, of which the following is a description.

My invention relates to means for resiliently mounting a supporting wheel upon the vehicle body.

The object of my invention is to provide a simple, strong and durable device of the kind described wherein the wheel is rigidly supported laterally while resiliently held against movement parallel to the plane of the wheel.

To this end my invention consists in the novel construction, arrangement and combination of parts herein shown and described and more particularly pointed out in the claims.

In the accompanying drawings wherein like or similar reference characters indicate like or corresponding parts: Figure 1 is a side elevation of a motorcycle equipped with my invention. Fig. 2, is an enlarged sectional detail of the wheel supporting mechanism taken substantially on line 2—2 of Fig. 3. Fig. 3, is a plan view of the parts shown in Fig. 2. Fig. 4, is a fragmentary section taken substantially on line 4—4 of Fig. 2.

In the drawings for the purpose of illustration, my device is shown applied to the rear wheel of a motorcycle, the main frame or body 1, of which is constructed in substantially the usual manner, having a front wheel 2 mounted in the front fork 3, with handle bars 4 for controlling its position and guiding the vehicle.

A motor 5 is mounted upon the frame 1 and a saddle 6 is provided upon which the operator sits to control the device, all of said parts being constructed and arranged in the usual or any desired manner.

The rear wheel 7 is also preferably of the usual construction with the ends of its axle rigidly secured near the free ends 8 of a bifurcated auxiliary frame, which is pivotally attached intermediate its ends to a pair of rearwardly extended bifurcated members 11 and 12 upon the main frame 1.

The member 11 is clearly shown in Fig. 3, of the drawings and consists of a pair of substantially similar side pieces, each rigidly attached at one end to the pedal hanger 13 at the lower side of the frame. A transverse part or bar 14 is rigidly secured to each of the side pieces of the member 11 intermediate their ends and rigidly connect the same. The member 12 is rigidly attached to the upper side of the frame 1 and extends downward and rearward to the free end of the member 11 with its lower end bifurcated and rigidly attached thereto as at 10.

In the form shown the auxiliary frame 9 is bifurcated at both ends as at 8 and 15 with the planes of the forked portions intersecting each other at substantially right angles along the center line of the frame. The fork 8 at the outer end of the frame 9 is arranged to receive the rim of the wheel 7 between the fork members and permit it to freely rotate, while the same is firmly supported in position upon its axle, both ends of which are rigidly secured to the frame. The fork 15 at the inner end of the frame is arranged to loosely embrace the transverse bar 14 of the frame 1. Suitable means are provided to coöperate with the frames 1 and 9 to resiliently maintain the same in their proper relative positions. As shown the bar 14 is provided with a suitable cup or socket 16 upon its upper and lower faces and a similar cup or socket 17 is adjustably secured to the inner faces of the fork members 15 of the auxiliary frame 9 by suitable adjusting screws 18 or equivalent means. The several parts are so arranged that each pair of sockets 16 and 17 coöperate to receive a coil spring 19 or other suitable means between them to resiliently hold the frame 9 in its proper relation to the frame 1. When thus constructed it is obvious that the adjusting screws 18 may be operated to secure any desired compression of the springs 19 and to partially control the position of the frame 9 upon the frame 1. In the form shown, also a bolt or stay 20 or other suitable means is provided to maintain the members of the fork 15 in position and prevent their spreading under the pressure of the springs 19 when in service.

The operation of my device is believed to be evident from the foregoing specification and drawings, and no further description is necessary.

It is obvious that various immaterial modifications may be made in my device without departing from the spirit of my invention, hence I do not wish to be understood as limiting myself to the exact form and construction shown.

What I claim as new and desire to secure by Letters Patent is:

1. In a device of the kind described, a main frame, an auxiliary frame pivotally mounted upon an extremity of said main frame and adapted to support a wheel in position, and extend outward beyond the rim of said wheel in combination with a plurality of opposed means coöperating with said main frame and one end of said auxiliary frame to resiliently maintain said auxiliary frame in position.

2. In a device of the kind described, a main frame an auxiliary frame pivotally attached intermediate its ends upon the extremity of said main frame and adapted to support a wheel in position and extend outward beyond the rim of said wheel, in combination with a plurality of opposing and substantially independent means coöperating with said main frame and one end of said auxiliary frame to resiliently maintain said auxiliary frame in position.

3. In a vehicle body, a forked main frame, an auxiliary frame mounted between the fork arms of said main frame and adapted to support a wheel in position and extend outward beyond the rim of said wheel, in combination with a plurality of opposing and substantially independent means coöperating with said main frame and one end of said auxiliary frame to resiliently maintain said auxiliary frame in position.

4. In a vehicle body, a main frame, an auxiliary frame forked at both ends mounted upon said main frame and adapted to receive and support a wheel between one pair of its fork arms, in combination with means positioned between the other pair of fork arms adapted to engage said main frame to resiliently maintain said auxiliary frame in position and resist its movement in either direction.

5. In a vehicle body, a main frame, a forked auxiliary frame pivotally mounted upon an extremity of said main frame with one end adapted to engage both ends of an axle to support a wheel in position, in combination with a plurality of opposing and substantially independent means coöperating with said main frame and one end of said auxiliary frame to resiliently maintain said auxiliary frame in position.

6. In a vehicle body a forked main frame, a forked auxiliary frame pivotally mounted between the forked arms of said main frame with one end adapted to engage both ends of an axle to support a wheel in position, in combination with a plurality of opposing and substantially independent means coöperating with said main frame and one end of said auxiliary frame to resiliently maintain said auxiliary frame in position.

7. In a vehicle body, a main frame, a forked auxiliary frame attached to said main frame and adapted to support a wheel in position, with a part of said main frame movably positioned between the fork arms of said auxiliary frame, in combination with means positioned between the fork arms of said auxiliary frame on opposite sides of the part of said main frame adapted to resiliently maintain said auxiliary frame in position.

8. In a vehicle body, a main frame, a forked auxiliary frame pivotally mounted upon said main frame and adapted to support a wheel in position, with a part of said main frame movably positioned between the fork arms of said auxiliary frame, in combination with a plurality of substantially independent means positioned between the fork arms of said auxiliary frame on opposite sides of a part of said main frame adapted to operate in opposition to each other to resiliently maintain said auxiliary frame in position.

9. In a vehicle body, a forked main frame, a forked auxiliary frame pivotally mounted between the fork arms of said main frame adapted to support a wheel in position, with a part of said main frame movably positioned between the fork arms of said auxiliary frame, in combination with means positioned between the fork arms of said auxiliary frame on opposite sides of said main frame adapted to resiliently resist the movement of said auxiliary frame in either direction.

10. In a vehicle body, a forked main frame, an auxiliary frame forked at both ends and pivotally mounted between the fork arms of said main frame and adapted to receive a wheel between one pair of its fork arms and support the same in position and with a part of said main frame movably positioned between the other fork arms of said auxiliary frame, in combination with means positioned between the fork arms of said auxiliary frame and the part of the main frame coöperating therewith to resiliently resist the movement of said auxiliary frame in either direction.

11. In a vehicle body, a forked main frame, an auxiliary frame forked at both ends and mounted between the extremities of the fork arms of said main frame and adapted to receive a wheel between one pair of its fork arms to support the same in position and with a part of said main frame movably positioned between the other pair of said fork arms, in combination with means positioned between the fork arms of said auxiliary frame on opposite sides of the coöperating part of said main frame to resiliently resist any movement of said auxiliary frame in either direction.

12. In a vehicle body, a forked main frame, an auxiliary frame forked at both ends, and pivotally mounted upon said main frame with a part of said main frame movably positioned between the fork arms at one end of said auxiliary frame, the fork arms at the opposite end of said auxiliary frame being adapted to engage both ends of an axle to support a wheel in position, in combination with means interposed between the forked parts at one end of said auxiliary frame and said main frame adapted to resiliently maintain said auxiliary frame in position.

13. In a vehicle body, a forked main frame, an auxiliary frame forked at both ends and pivotally mounted intermediate its ends between the fork arms upon said main frame, and adapted to support a wheel in position between one pair of its fork arms in combination with means positioned between the fork arms at the opposite end of said auxiliary frame and engaging the opposite sides of a part of said main frame to resiliently resist the movement of said auxiliary frame in either direction.

14. In a vehicle body, a forked main frame, an auxiliary frame forked at both ends and pivotally mounted intermediate its ends between the ends of the fork arms of said main frame, the fork at one end of said auxiliary frame being arranged to support a wheel in position, in combination with means positioned between the fork arms at the opposite end of said auxiliary frame and engaging the opposite sides of a part of said main frame positioned between the fork arms to resiliently resist the movement of said auxiliary frame in either direction.

In testimony whereof, I have hereunto signed my name in the presence of two subscribing witnesses.

JOHN E. DUKELOW.

Witnesses:
BURTON U. HILLS,
BLANCHE CHALMERS.

Copies of this patent may be obtained for five cents each, by addressing the "Commissioner of Patents, Washington, D. C."